(12) United States Patent
Mori

(10) Patent No.: US 11,092,780 B2
(45) Date of Patent: Aug. 17, 2021

(54) IMAGE PICKUP OPTICAL SYSTEM AND IMAGE PICKUP APPARATUS INCLUDING THE SAME

(71) Applicant: CANON KABUSHIKI KAISHA, Tokyo (JP)

(72) Inventor: Kentaro Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 16/290,242

(22) Filed: Mar. 1, 2019

(65) Prior Publication Data

US 2019/0271830 A1    Sep. 5, 2019

(30) Foreign Application Priority Data

Mar. 5, 2018  (JP) .............................. JP2018-038382

(51) Int. Cl.
*G02B 13/00*  (2006.01)
*G02B 15/177*  (2006.01)
(Continued)

(52) U.S. Cl.
CPC ........... *G02B 13/0035* (2013.01); *G02B 9/12* (2013.01); *G02B 15/177* (2013.01); *G02B 27/0025* (2013.01)

(58) Field of Classification Search
CPC .... G02B 15/173; G02B 15/177; G02B 15/14; G02B 15/144113; G02B 13/009; G02B 15/143507; G02B 27/646; G02B 15/00; G02B 3/14; G02B 15/144511; G02B 3/0081; G02B 7/102; G02B 13/0045; G02B 15/17; G02B 27/0025; G02B 13/18;
(Continued)

(56) References Cited

U.S. PATENT DOCUMENTS 9,977,220 B2      5/2018  Yokoyama et al.
2007/0201143 A1*  8/2007  Kohno ........... G02B 15/144511
                                                                359/680

(Continued)

FOREIGN PATENT DOCUMENTS

JP    5932444 B2       6/2016
JP    2016161650 A     9/2016
JP    2016212346 A    12/2016

*Primary Examiner* — William R Alexander
*Assistant Examiner* — Sharrief I Broome
(74) *Attorney, Agent, or Firm* — Carter, DeLuca & Farrell LLP

(57) ABSTRACT

Provided is an optical system including, in order from object side to image side, a positive first lens unit (LU), a positive second LU and a third LU, in which intervals between adjacent LUs are changed during focusing. The second LU moves toward object side during focusing from infinity to the closest distance. In order from object side to image side, second LU includes at least one positive lens, a negative lens Ln having a meniscus shape that is concave toward image side, an aperture stop, and a cemented lens consisting of a plurality of lenses and an optical element Gp cemented to one another and having a concave lens surface on object side, then third LU includes a positive lens and a negative lens. A refractive index of a material of Ln with respect to d-line and a partial dispersion characteristic of a material of Gp are appropriately set.

13 Claims, 11 Drawing Sheets

(51) Int. Cl.
*G02B 27/00* (2006.01)
*G02B 9/12* (2006.01)

(58) Field of Classification Search
CPC ........ G02B 15/1421; G02B 15/144109; G02B 15/145113; G02B 15/145129; G03B 2205/0046; G03B 17/00; G03B 17/17; G03B 5/00; G03B 13/32; G03B 13/36; G03B 15/00; G03B 17/06; G03B 17/14; G03B 17/54; G03B 19/00; G03B 19/14; G03B 21/005; G03B 21/14; G03B 21/142; G03B 21/28; G03B 2205/0007; G03B 2205/0084; G03B 2217/007; G03B 3/10; H04N 5/2254; H04N 5/23209; H04N 5/23296; H04N 5/232; H04N 5/2251; H04N 5/23212; H04N 5/238; H04N 13/236; H04N 5/225; H04N 5/23241; H04N 5/23299; H04N 5/77; H04N 5/907; H04N 9/3176; H04N 9/7921

See application file for complete search history.

(56) References Cited

U.S. PATENT DOCUMENTS

| | | | |
|---|---|---|---|
| 2014/0240851 A1* | 8/2014 | Kawamura | G02B 13/18 359/708 |
| 2016/0252706 A1* | 9/2016 | Yamanaka | G02B 13/005 359/754 |
| 2017/0168269 A1* | 6/2017 | Yasui | G02B 5/1842 |
| 2018/0024315 A1* | 1/2018 | Sato | G02B 1/115 359/601 |
| 2018/0143409 A1 | 5/2018 | Mori | |

* cited by examiner

IMAGE PICKUP OPTICAL SYSTEM AND IMAGE PICKUP APPARATUS INCLUDING THE SAME

BACKGROUND OF THE INVENTION

Field of the Invention

The present invention relates to an image pickup optical system and an image pickup apparatus including the same, and is suitable for a digital still camera, a digital video camera, a TV camera, a monitoring camera, or other image pickup apparatus, for example.

Description of the Related Art

As image pickup optical systems for use with image pickup apparatus, there is a demand for medium-telephoto type image pickup optical systems each having a large aperture ratio with an open f-number (Fno) of about 1.8, for example, an image pickup angle of view of from about 40° to about 24°, and a relatively long focal length. The medium-telephoto type image pickup optical systems are widely used for portrait photography and indoor sports photography. Moreover, it is strongly required of such image pickup optical systems to be capable of fast focusing and cause small variations in aberrations during focusing, for example.

In the related art, there have been known medium-telephoto type image pickup optical systems each having a large aperture ratio, which satisfy those requirements.

In U.S. Patent Application Publication No. 2016/0252706, there is disclosed an image pickup optical system including, in order from an object side to an image side, a first lens unit having a positive refractive power, a second lens unit having a positive refractive power, and a third lens unit having a positive refractive power, in which the second lens unit is moved on an optical axis for focusing.

SUMMARY OF THE INVENTION

It is an object of the present invention to provide an image pickup optical system having a large aperture ratio, a small size as a whole, and high optical performance.

The image pickup optical system according to the present invention includes, in order from an object side to an image side, a first lens unit having a positive refractive power, a second lens unit having a positive refractive power and a third lens unit, in which an interval between each pair of adjacent lens units is changed during focusing. The second lens unit is configured to move toward the object side during focusing from infinity to the closest distance. The second lens unit includes, in order from the object side to the image side, at least one positive lens, a negative lens Ln having a meniscus shape that is concave toward the image side, an aperture stop, and a cemented lens consisting of a plurality of lenses and an optical element Gp cemented to one another and having a concave lens surface on the object side. The third lens unit includes, in order from the object side to the image side, a positive lens and a negative lens. The image pickup optical system satisfies the following conditional expressions:

$$1.70 < Nn; \text{ and}$$

$$0.0272 < \theta gF + 1.665 \times 10^{-7} \times vd^3 + 5.213 \times 10^{-5} \times vd^2 - 5.656 \times 10^{-3} \times vd + 7.278 \times 10^{-1})$$

where Nn is a refractive index of a material of the negative lens Ln with respect to a d-line, vd is an Abbe number of a material of the optical element Gp, and θgF is a partial dispersion ratio of the material of the optical element Gp.

Further features of the present invention will become apparent from the following description of exemplary embodiments with reference to the attached drawings.

DESCRIPTION OF THE EMBODIMENTS

Now, exemplary embodiments of the present invention are described with reference to the attached drawings.

An optical system according to each Example of the present invention includes, in order from an object side to an image side: a first lens unit having a positive refractive power; a second lens unit having a positive refractive power; and a third lens unit. An interval between each pair of adjacent lens units is changed during a focusing operation (focusing). Moreover, the second lens unit is configured to move toward the object side during focusing from infinity to the closest distance.

The second lens unit includes, in order from the object side to the image side, at least one positive lens, a negative lens Ln having a meniscus shape that is concave toward the image side, an aperture stop, and a cemented lens consisting of a plurality of lenses and an optical element Gp cemented to one another and having a concave lens surface on the object side. The third lens unit includes, in order from the object side to the image side, a positive lens and a negative lens.

Figure 1:
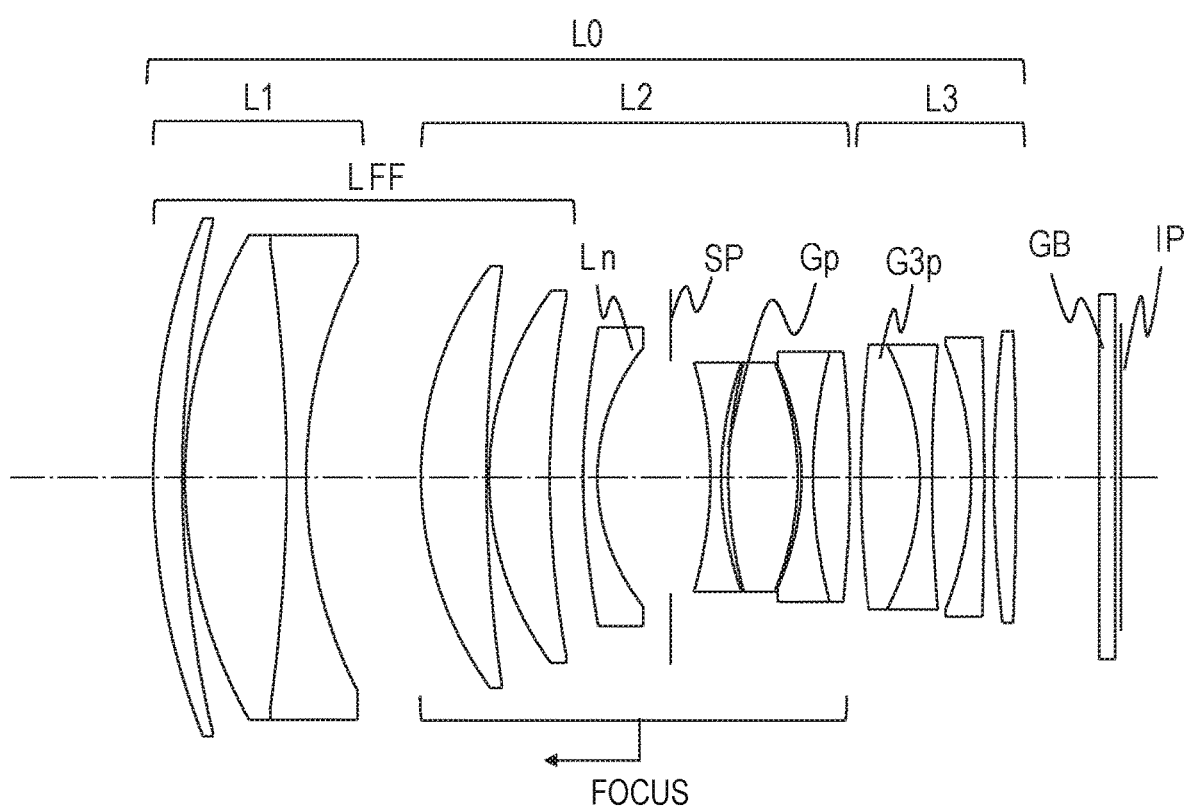
FIG. 1 is a lens cross-sectional view of an optical system according to Example 1 of the present invention.
Figure 2:
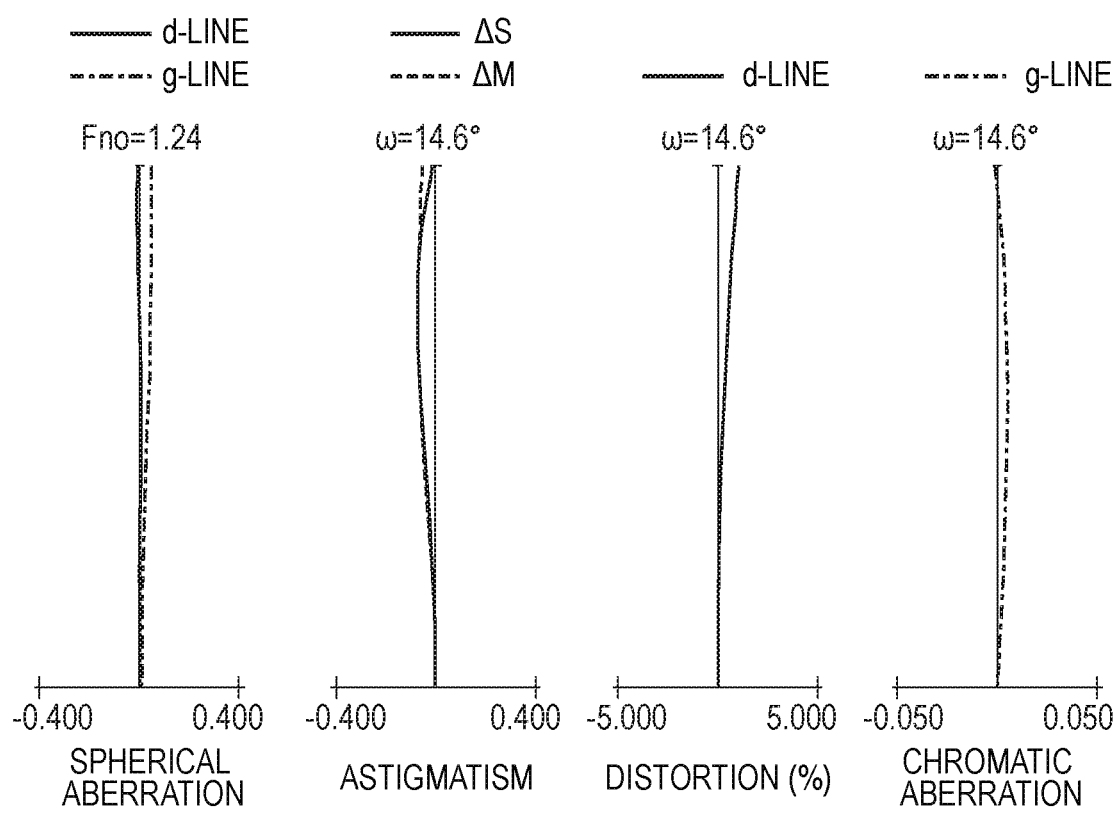
FIG. 2 is aberration diagrams of the optical system according to Example 1 when the optical system is focused at infinity.

FIG. 1 is a lens cross-sectional view of an optical system according to Example 1 of the present invention when the optical system is focused at infinity, and FIG. 2 is aberration diagrams of the optical system according to Example 1 of the present invention when the optical system is focused at infinity.

Figure 3:
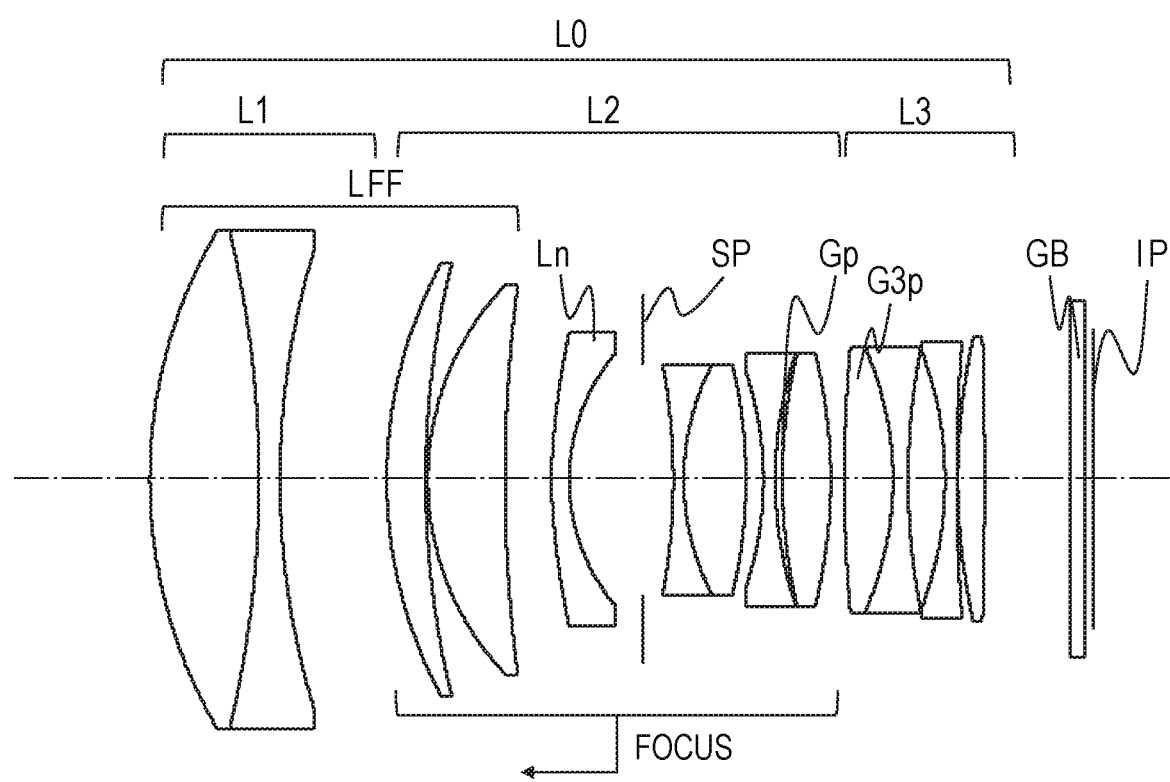
FIG. 3 is a lens cross-sectional view of an optical system according to Example 2 of the present invention.
Figure 4:
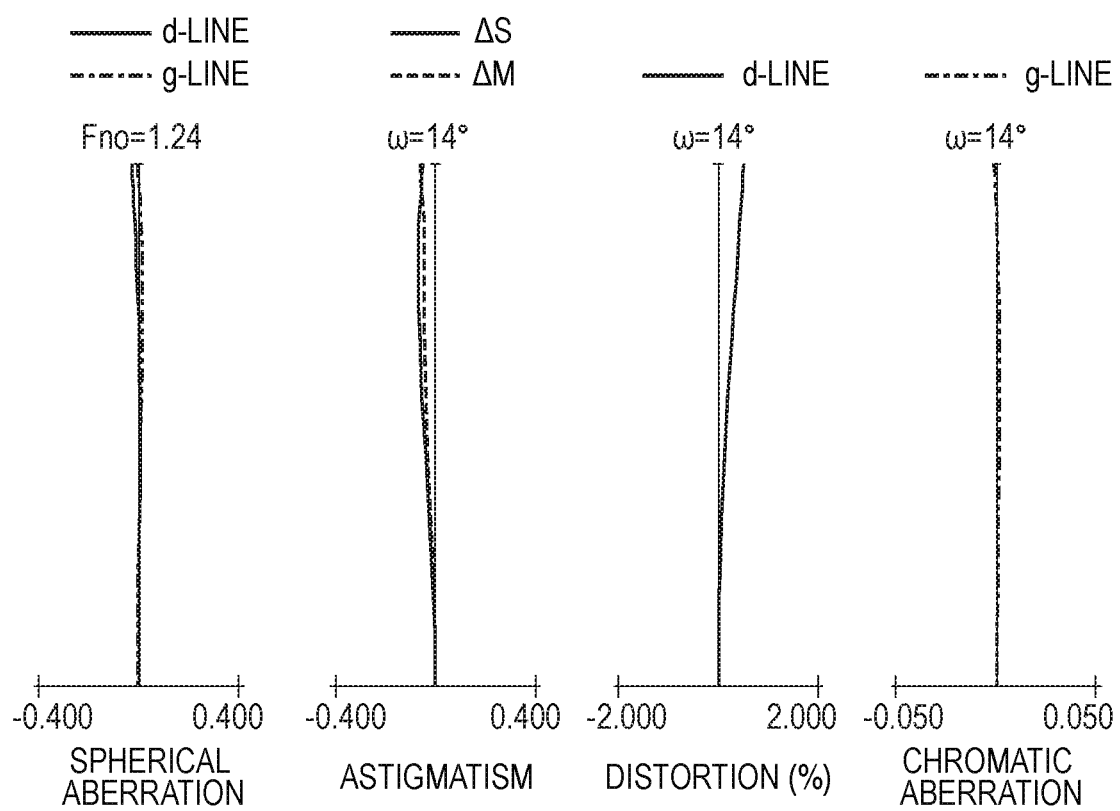
FIG. 4 is aberration diagrams of the optical system according to Example 2 when the optical system is focused at infinity.

FIG. 3 is a lens cross-sectional view of an optical system according to Example 2 of the present invention when the optical system is focused at infinity, and FIG. 4 is aberration diagrams of the optical system according to Example 2 of the present invention when the optical system is focused at infinity.

Figure 5:
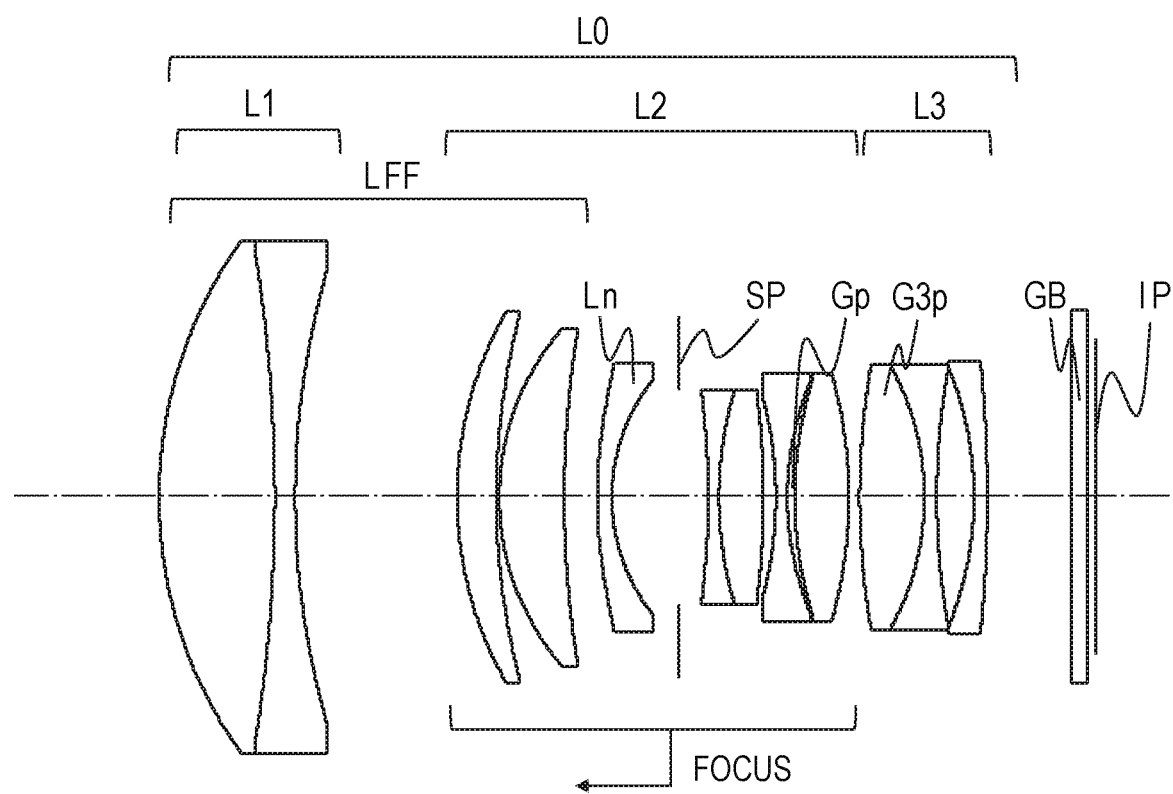
FIG. 5 is a lens cross-sectional view of an optical system according to Example 3 of the present invention.
Figure 6:
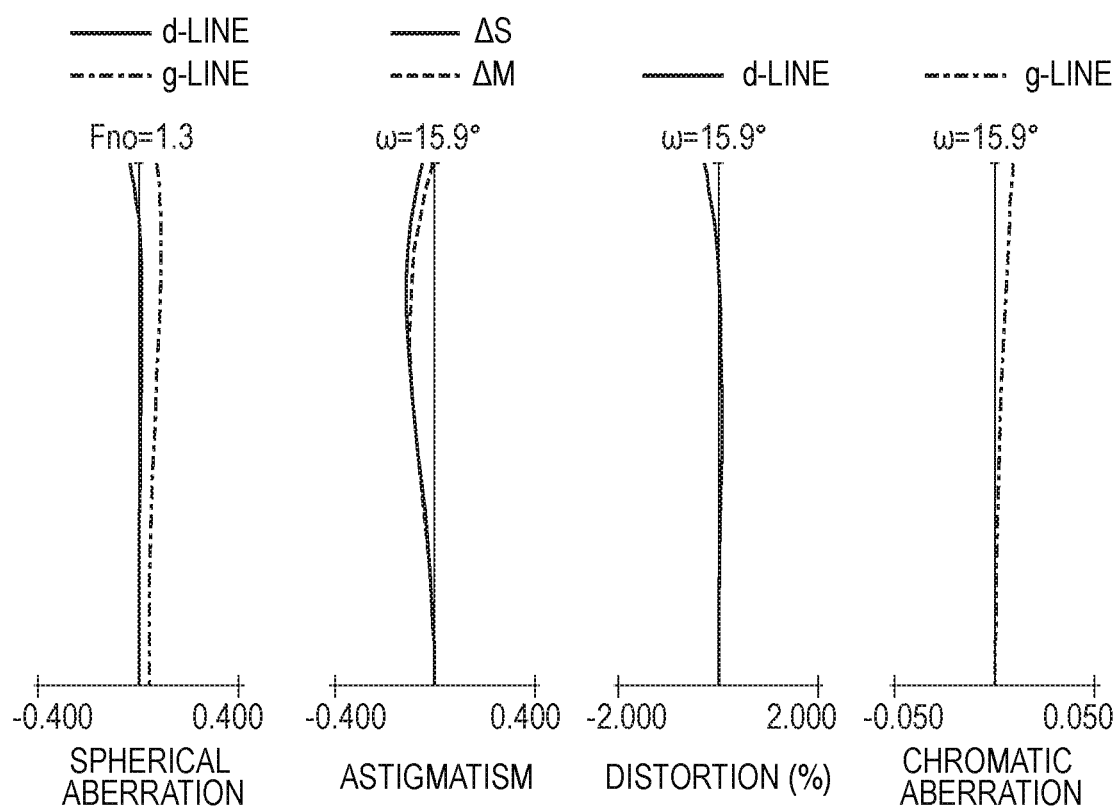
FIG. 6 is aberration diagrams of the optical system according to Example 3 when the optical system is focused at infinity.

FIG. 5 is a lens cross-sectional view of an optical system according to Example 3 of the present invention when the optical system is focused at infinity, and FIG. 6 is aberration diagrams of the optical system according to Example 3 of the present invention when the optical system is focused at infinity.

Figure 7:
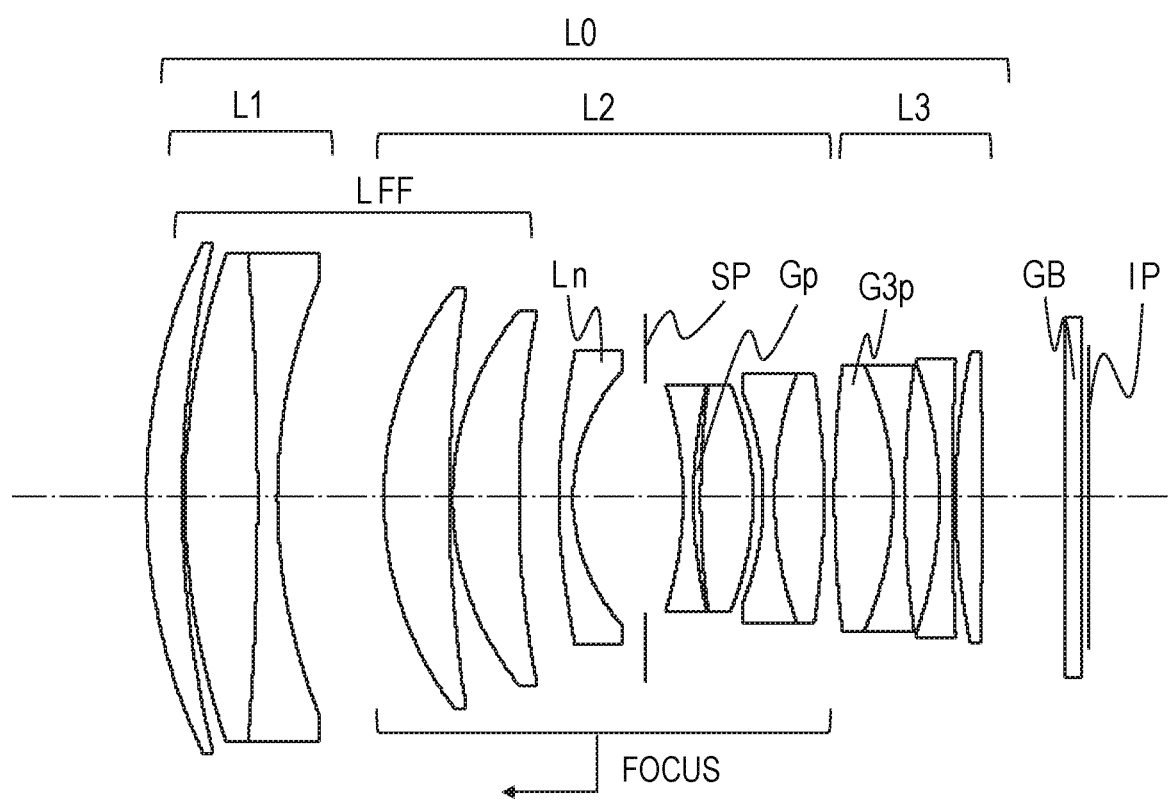
FIG. 7 is a lens cross-sectional view of an optical system according to Example 4 of the present invention.
Figure 8:
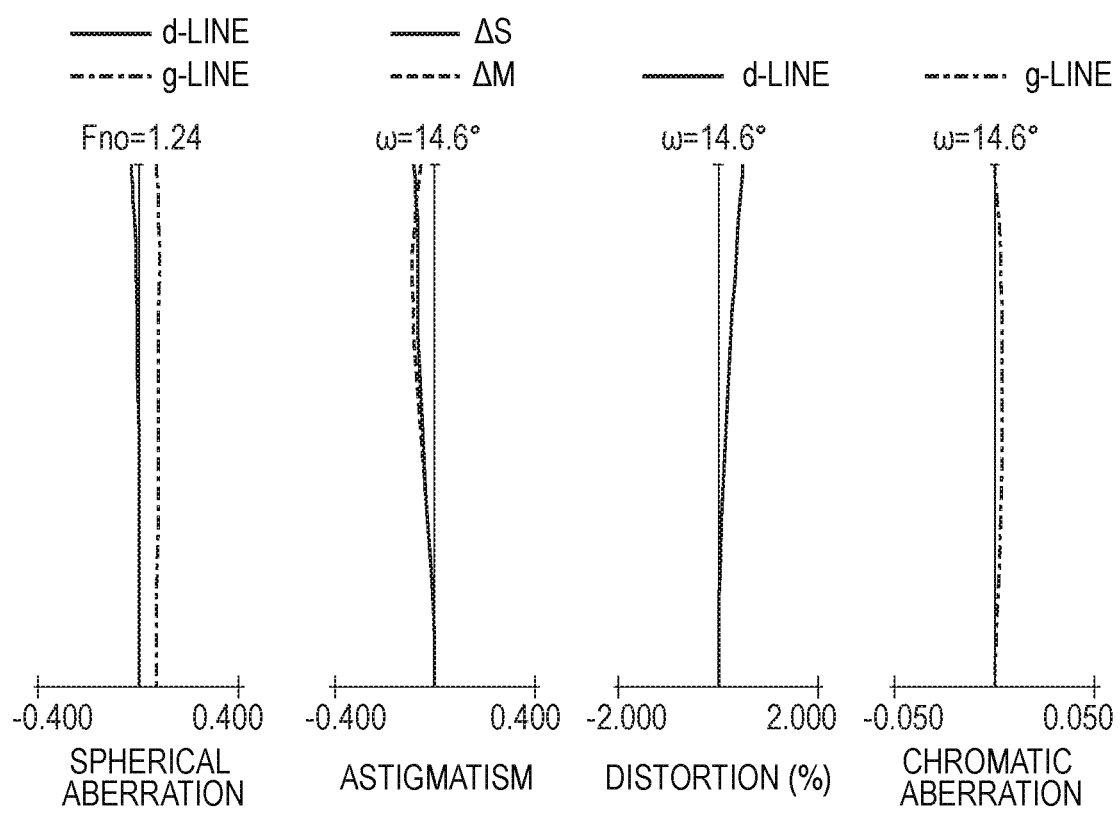
FIG. 8 is aberration diagrams of the optical system according to Example 4 when the optical system is focused at infinity.

FIG. 7 is a lens cross-sectional view of an optical system according to Example 4 of the present invention when the optical system is focused at infinity, and FIG. 8 is aberration diagrams of the optical system according to Example 4 of the present invention when the optical system is focused at infinity.

Figure 9:
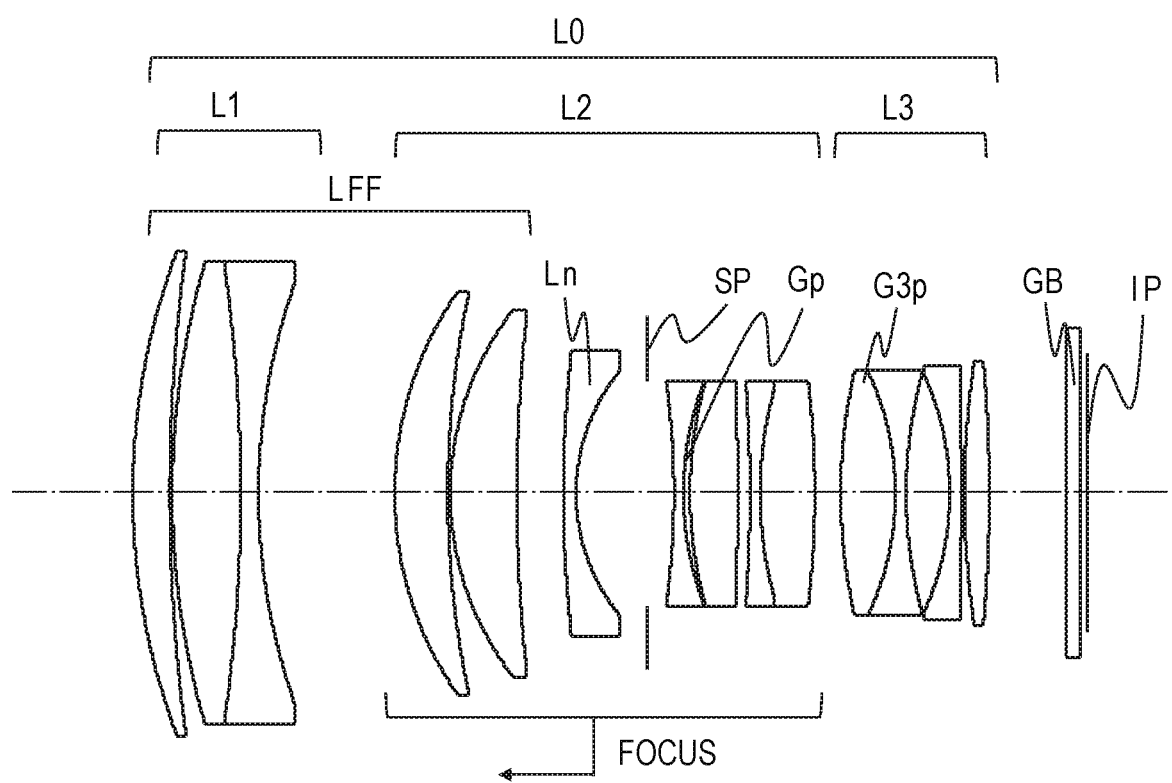
FIG. 9 is a lens cross-sectional view of an optical system according to Example 5 of the present invention.
Figure 10:
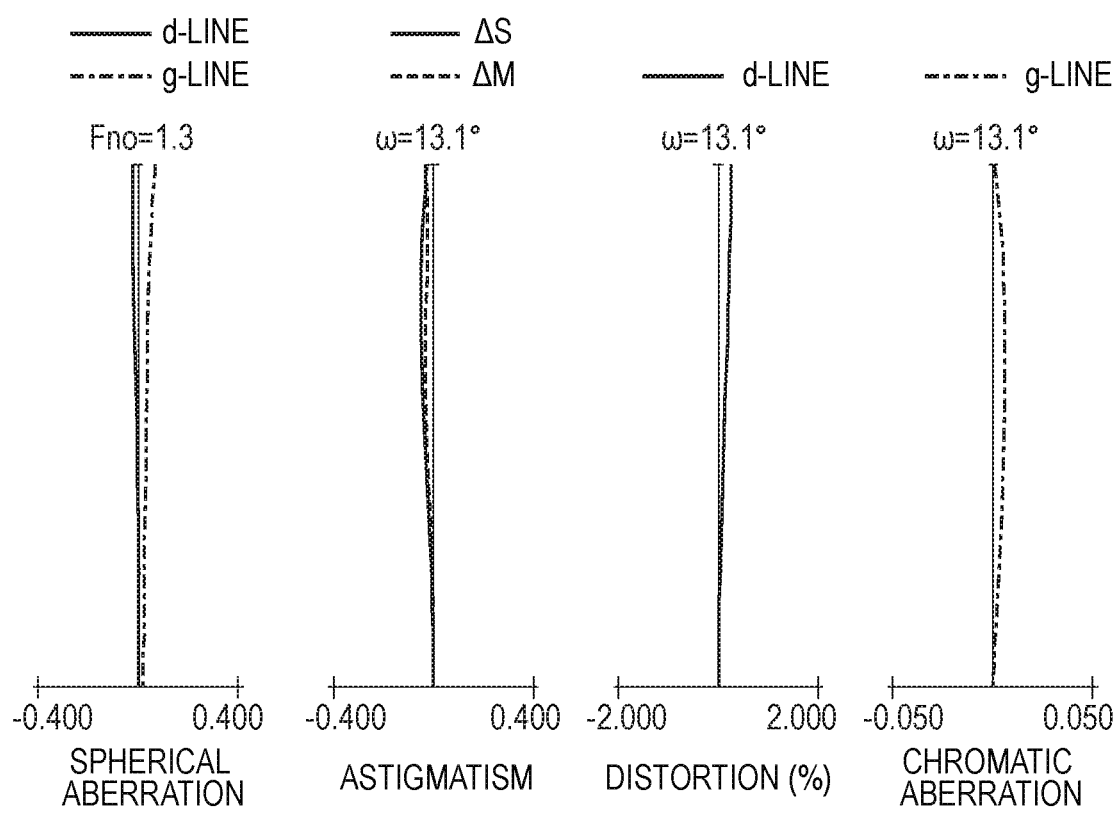
FIG. 10 is aberration diagrams of the optical system according to Example 5 when the optical system is focused at infinity.

FIG. 9 is a lens cross-sectional view of an optical system according to Example 5 of the present invention when the optical system is focused at infinity, and FIG. 10 is aberration diagrams of the optical system according to Example 5 of the present invention when the optical system is focused at infinity.

Figure 11:
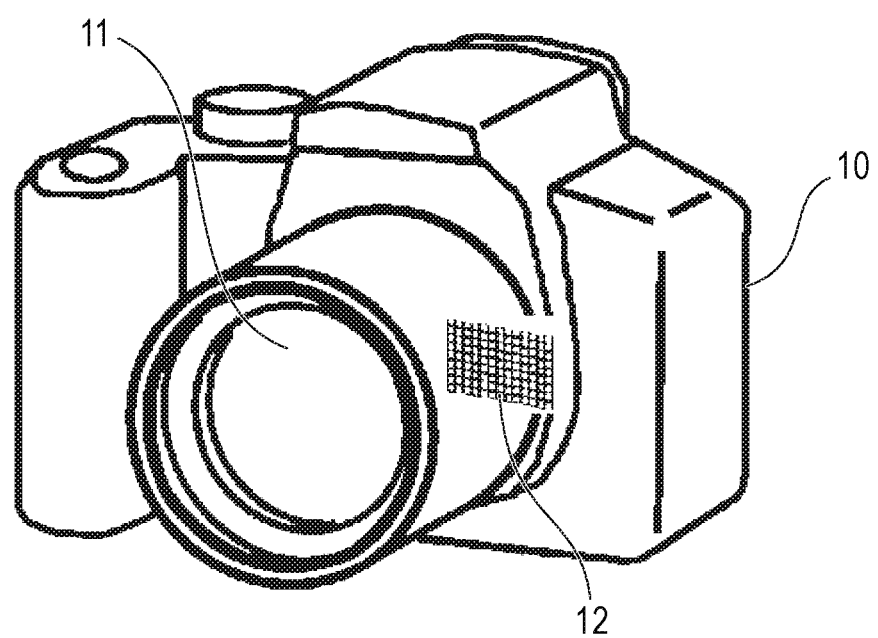
FIG. 11 is a schematic view of a main part of an image pickup apparatus according to one embodiment of the present invention.

FIG. 11 is a schematic view of a main part of an image pickup apparatus according to one embodiment of the present invention.

In the lens cross-sectional views, the left side is the object side, and the right side is the image side. An image pickup optical system L0 includes a first lens unit L1 having a positive refractive power, a second lens unit L2 having a positive refractive power, and a third lens unit L3 having a positive or negative refractive power. The second lens unit L2 includes a negative lens Ln. The second lens unit L2 also includes an optical element Gp having a positive refractive power and an aperture stop SP. The third lens unit L3 includes a positive lens G3p arranged closest to the object side.

An image plane IP corresponds to an image pickup plane of a CMOS sensor or other image pickup element (photoelectric conversion element). An optical block GB, for example, a low-pass filter or an IR cut filter, is arranged before the image pickup plane as required. A lens system LFF is arranged on the object side of the negative lens Ln.

In the spherical aberration diagrams, an f-number is represented by Fno. Moreover, a d-line (wavelength: 587.6 nm) is represented by "d-line", and a g-line (wavelength: 435.8 nm) is represented by "g-line". In the astigmatism diagrams, a sagittal image plane for the d-line is represented by "ΔS", and a meridional image plane for the d-line is represented by "ΔM". Distortion diagrams are illustrated for the d-line. Lateral chromatic aberration diagrams are illustrated for the g-line. A half angle of view (°) is represented by "ω".

The image pickup optical system according to each of Examples, which has a large aperture ratio and a small size as a whole, and with which high image quality is obtained, is described.

The image pickup optical system L0 includes, in order from the object side to the image side: the first lens unit L1 having the positive refractive power; the second lens unit L2 having the positive refractive power; and the third lens unit L3 having the positive or negative refractive power. The second lens unit L2 includes, in order from the object side to the image side, the at least one positive lens, the negative lens Ln having the meniscus shape with a concave surface facing the image side, the aperture stop SP, and the cemented lens consisting of the plurality of lenses including the optical element Gp cemented to one another and having the concave lens surface on the object side.

The third lens unit L3 includes, in order from the object side to the image side, the positive lens and the negative lens. An interval between each pair of adjacent lens units is changed during focusing. The second lens unit L2 is configured to move toward the object side during focusing from infinity to a close distance.

In order to obtain the image pickup optical system L0 having the small size as a whole while having the large aperture ratio, the above-mentioned configuration is adopted. In order to downsize the medium-telephoto type image pickup optical system having the large aperture, it is required to effectively converge a light flux that determines the f-number (f-number light flux), and hence the first lens unit L1 having the positive refractive power is arranged closest to the object side. The second lens unit L2 has the largest refractive power as compared to the first lens unit L1 and the third lens unit L3. Therefore, in order to prevent an increase in size of the entire image pickup optical system L0, it is required that the second lens unit L2 have a lens configuration that is less likely to generate aberrations.

Therefore, the second lens unit L2 includes, in order from the object side to the image side, the at least one positive lens, the negative lens Ln having the meniscus shape that is concave toward the image side, the aperture stop SP, and the cemented lens consisting of the plurality of lenses including the optical element Gp cemented to one another and being concave toward the object side.

Through thus arranging the lenses to be substantially symmetric with respect to the aperture stop SP, various aberrations generated by asymmetry, such as coma, distortion, and lateral chromatic aberration, are reduced. An effective diameter of the third lens unit L3 is generally determined not by the f-number light flux but by an off-axial light flux. In order to reduce the diameter of the third lens unit L3, there is adopted the lens configuration at least including, in order from the object side to the image side, the positive lens and the negative lens.

The third lens unit L3 refracts the off-axial light flux in an optical axis direction by arranging the positive lens G3p closest to the object side, to thereby downsize the third lens unit L3. Moreover, with the inclusion of the negative lens, the large aperture ratio is achieved while achromatization in the third lens unit L3 is facilitated. Moreover, in order to downsize the image pickup optical system L0, the second lens unit L2 is configured to move toward the object side during focusing from infinity to the close distance. With the third lens unit L3 being configured not to move during focusing, a focusing mechanism is simplified to downsize the entire system.

In each of Examples, a refractive index of a material of the negative lens Ln with respect to the d-line is represented by Nn, and a partial dispersion characteristic of a material of the optical element Gp is represented by $\Delta\theta gF$. Then, the following conditional expressions are satisfied:

$$1.70 < Nn \qquad (1); \text{ and}$$

$$0.0272 < \Delta\theta gF \qquad (2).$$

The partial dispersion characteristic $\Delta\theta gF$ is defined by the following expression using an Abbe number "vd" and a partial dispersion ratio $\theta gF$ of the material of the optical element Gp.

$$\Delta\theta gF = \theta gF - (-1.665 \times 10^{-7} \times vd^3 + 5.213 \times 10^{-5} \times vd^2 - 5.656 \times 10^{-3} \times vd + 7.278 \times 10^{-1})$$

The Abbe number "vd" and the partial dispersion ratio θgF are expressed by the following expressions when refractive indices with respect to the d-line (587.6 nm), the g-line (435.8 nm), a C-line (656.3 nm), and an F-line (486.1 nm) are represented by Nd, Ng, NC, and NF, respectively.

$$vd=(Nd-1)/(NF-NC)$$

$$\theta gF=(Ng-NF)/(NF-NC)$$

Next, technical meanings of the above-mentioned conditional expressions are described. The conditional expression (1) is intended to obtain the high image quality while downsizing the entire system. When the refractive index Nn becomes much smaller to fall below the lower limit value of the conditional expression (1), the refractive power of the negative lens becomes smaller, and an action of correcting spherical aberration, coma, and other various aberrations becomes weaker, with the result that it becomes difficult to obtain the high image quality while downsizing the entire system. Moreover, when the refractive index Nn becomes much smaller to fall below the lower limit value of the conditional expression (1), and curvature radii of lens surfaces are reduced to secure the negative refractive power and hence forcedly correct the various aberrations, large higher-order aberrations are generated when the large aperture ratio is to be achieved. Then, it becomes difficult to obtain the high image quality while downsizing the entire system.

The conditional expression (2) is intended to obtain the high image quality while achieving the large aperture ratio. When the partial dispersion characteristic becomes much smaller to fall below the lower limit value of the conditional expression (2), it becomes difficult to sufficiently correct axial chromatic aberration, and to achieve the large aperture ratio and the high image quality. Through arrangement of the optical element Gp on the image side of the aperture stop SP in the second lens unit L2, the optical element Gp is reduced in diameter, and axial chromatic aberration is satisfactorily corrected.

In order to downsize the image pickup optical system L0 and achieve the high image quality, it is preferred that the refractive index of the material of the negative lens Ln having the meniscus shape with respect to the d-line be more than 1.7. The reasons are as described above. However, when the negative lens having the large refractive index is arranged, chromatic aberration is increased mainly in a short wavelength region. This is because the refractive index of the material becomes higher as the wavelength becomes shorter. In order to correct the increase in chromatic aberration, the optical element Gp having the positive refractive power and the large partial dispersion ratio θgF is used to satisfactorily correct the chromatic aberration.

In each of Examples, with the above-mentioned configuration, there is obtained the image pickup optical system having the small size as the entire system and the high image quality while achieving the large aperture ratio.

In each of Examples, it is preferred to set the numerical ranges of the conditional expressions (1) and (2) as follows.

$$1.72<Nn \quad (1a)$$

$$0.0300<\Delta\theta gF \quad (2a)$$

It is more preferred to set the numerical ranges of the conditional expressions (1a) and (2a) as follows.

$$1.82<Nn \quad (1b)$$

$$0.0500<\Delta\theta gF \quad (2b)$$

In each of Examples, it is more preferred to satisfy at least one of conditional expressions provided below. A focal length of the optical element Gp is represented by FGp, and a focal length of the entire system is represented by F. The focal length FGp of the optical element Gp is a focal length obtained when the optical element Gp is placed in air.

A focal length of the positive lens G3p closest to the object side in the third lens unit L3 is represented by F3p. A refractive index of a material of the positive lens G3p closest to the object side in the third lens unit L3 with respect to the d-line is represented by N3p. A focal length of the negative lens Ln is represented by LnF, and a focal length of the second lens unit L2 is represented by F2. An interval between the negative lens Ln and a lens arranged adjacent to and on the object side of the negative lens Ln is represented by LnD, and a focal length of the lens system LFF arranged on the object side of the negative lens Ln when the image pickup optical system L0 is focused at infinity is represented by FF. An air-equivalent back focus is represented by BF, and a total lens length (distance from a surface closest to the object side in the optical system L0 to the image plane IP) is represented by TD. An open f-number of the image pickup optical system L0 is represented by Fno.

At this time, it is preferred to satisfy at least one of the following conditional expressions.

$$3.40<FGp/F<4.45 \quad (3)$$

$$0.12<F3p/F<0.74 \quad (4)$$

$$1.80<N3p \quad (5)$$

$$0.22|LnF|/F2<0.87 \quad (6)$$

$$0.8<F2/F<1.5 \quad (7)$$

$$0.070<LnD/FF<0.142 \quad (8)$$

$$0.085<BF/TD<0.150 \quad (9)$$

$$Fno<1.45 \quad (10)$$

Next, technical meanings of the above-mentioned conditional expressions are described. The conditional expression (3) is intended to achieve the high image quality. When the ratio of the conditional expression (3) exceeds the upper limit value of the conditional expression (3), and the focal length FGp of the optical element Gp becomes longer, an effect of correcting axial chromatic aberration becomes weaker, and chromatic aberration on the short wavelength side, for example, the g-line, is insufficiently corrected. When the ratio of the conditional expression (3) falls below the lower limit value of the conditional expression (3), and the focal length FGp of the optical element Gp becomes shorter, axial chromatic aberration on the short wavelength side, for example, the g-line, is excessively corrected, and it becomes difficult to achieve the high image quality.

The conditional expression (4) is intended to downsize the entire system and achieve the high image quality. When the ratio of the conditional expression (4) exceeds the upper limit value of the conditional expression (4), and the focal length F3p of the positive lens G3p closest to the object side in the third lens unit L3 becomes longer, the action of refracting the off-axial light flux in the optical axis direction becomes weaker, an effective diameter becomes larger, and it becomes difficult to downsize the entire system. When the ratio of the conditional expression (4) falls below the lower limit value of the conditional expression (4), and the focal length F3p of the positive lens G3p closest to the object side in the third lens unit L3 becomes shorter, large field curvature and other various aberrations are generated, and it becomes difficult to obtain the high image quality.

The conditional expression (5) is intended to achieve downsizing and the high image quality. When the refractive index N3p of the material of the positive lens G3p closest to the object side in the third lens unit L3 with respect to the d-line becomes smaller to fall below the lower limit value of the conditional expression (5), the action of refracting the off-axial light flux in the optical axis direction becomes weaker. Moreover, when the focal length of the positive lens G3p closest to the object side in the third lens unit L3 is set constant, curvature radii of lens surfaces become smaller, and large field curvature and other various aberrations are generated, with the result that it becomes difficult to correct higher-order aberrations while achieving the large aperture ratio. Therefore, it becomes difficult to downsize the entire system and achieve the high image quality.

The conditional expression (6) is intended to achieve the high image quality. When the ratio of the conditional expression (6) falls below the lower limit value of the conditional expression (6), and the negative focal length of the negative lens Ln becomes shorter (when an absolute value of the negative focal length becomes smaller), large spherical aberration, coma, and other various aberrations are generated, and it becomes difficult to achieve the high image quality. When the ratio of the conditional expression (6) exceeds the upper limit value of the conditional expression (6), and the negative focal length of the negative lens Ln becomes longer (when the absolute value of the negative focal length becomes larger), spherical aberration, coma, and other various aberrations are insufficiently corrected, and it becomes difficult to achieve the high image quality.

The conditional expression (7) is intended to downsize the entire system and achieve the high image quality. When the ratio of the conditional expression (7) falls below the lower limit value of the conditional expression (7), and the focal length F2 of the second lens unit L2 becomes shorter, large spherical aberration, coma, and other various aberrations are generated, and it becomes difficult to achieve the high image quality. When the ratio of the conditional expression (7) exceeds the upper limit value of the conditional expression (7), and the focal length F2 of the second lens unit L2 becomes longer, it becomes difficult to effectively converge an axial light flux, and to downsize the entire system.

The conditional expression (8) is intended to downsize the entire system. When the ratio of the conditional expression (8) falls below the lower limit value of the conditional expression (8), and the interval LnD between the negative lens Ln and the lens on the object side of the negative lens Ln becomes much shorter, it becomes difficult to reduce an effective diameter of the negative lens Ln, and to downsize the entire system. The mechanical structure of the aperture stop SP is constructed near the aperture stop SP, and hence in order to reduce the size in a radial direction, it is effective to reduce diameters of lenses near the aperture stop SP. When the ratio of the conditional expression (8) exceeds the upper limit value of the conditional expression (8), and the interval LnD between the negative lens Ln and the lens on the object side of the negative lens Ln becomes much longer, the total lens length becomes longer, and it becomes difficult to downsize the entire system.

The conditional expression (9) is intended to downsize the entire system and achieve the high image quality. When the ratio of the conditional expression (9) falls below the lower limit value of the conditional expression (9), and the back focus becomes much shorter, light generated by being reflected by the image pickup plane becomes noise light, and becomes more likely to reach the image pickup plane through reflection on lens surfaces, with the result that an SN ratio of an image is reduced, and hence that it becomes difficult to achieve the high image quality. When the ratio of the conditional expression (9) exceeds the upper limit value of the conditional expression (9), and the back focus becomes much longer, it becomes difficult to downsize the entire system.

The conditional expression (10) is intended to achieve the large aperture ratio. When the f-number becomes much larger to exceed the upper limit value of the conditional expression (10), it becomes difficult to obtain the large aperture ratio.

It is preferred to set the numerical ranges of the conditional expressions (3) to (10) as follows.

$$3.50 < FGp/F < 4.35 \tag{3a}$$

$$0.22 < F3p/F < 0.64 \tag{4a}$$

$$1.84 < N3p \tag{5a}$$

$$0.32 |LnF|/F2 < 0.77 \tag{6a}$$

$$0.9 < F2/F < 1.4 \tag{7a}$$

$$0.075 < LnD/FF < 0.132 \tag{8a}$$

$$0.090 < BF/TD < 0.130 \tag{9a}$$

$$Fno < 1.40 \tag{10a}$$

It is more preferred to set the numerical ranges of the conditional expressions (3a) to (10a) as follows.

$$3.60 < FGp/F < 4.25 \tag{3b}$$

$$0.32 < F3p/F < 0.54 \tag{4b}$$

$$1.87 < N3p \tag{5b}$$

$$0.42 |LnF|/F2 < 0.67 \tag{6b}$$

$$1.0 < F2/F < 1.3 \tag{7b}$$

$$0.080 < LnD/FF < 0.122 \tag{8b}$$

$$0.096 < BF/TD < 0.112 \tag{9b}$$

$$Fno < 1.35 \tag{10b}$$

Moreover, in each of Examples, it is preferred that the first lens unit L1 include, in order from the object side to the image side, at least one positive lens and one negative lens. With this configuration, a lens unit thickness of the first lens unit L1 is reduced, and aberrations are satisfactorily corrected, with the result that downsizing of the entire system and the high image quality are easily achieved.

Moreover, in each of Examples, it is preferred that the negative lens Ln included in the second lens unit L2 have an aspherical lens surface on the object side. With the negative lens Ln being an aspherical lens, spherical aberration, coma, and other various aberrations can be effectively corrected, and the high image quality is easily achieved.

Moreover, in each of Examples, it is preferred that the second lens unit L2 include, on the image side of the aperture stop SP, two cemented lenses each consisting of a plurality of lenses cemented to one another and having a meniscus shape with a concave surface facing the object side. With this configuration, an optical system that is a substantially symmetric system with respect to the aperture stop SP is obtained, with the result that coma, field curvature, and other various aberrations can be effectively corrected, and the high image quality is easily achieved.

In each of Examples, various known methods may be applied to electronically correct distortion and other aberrations. In each of Examples, a low-pass filter, an IR cut filter, or other optical member may be arranged before the image pickup plane as required. In each of Examples, lens surfaces may be applied a coating having a transmittance distribution as required.

Next, lens configurations in each of Examples are described.

Example 1

The image pickup optical system according to Example 1 has a focal length of 83.00 mm and an f-number of 1.24. The image pickup optical system L0 includes a first lens unit L1 having a positive refractive power, a second lens unit L2 having a positive refractive power, and a third lens unit L3 having a positive refractive power.

The first lens unit L1 consists of, in order from the object side to the image side, a positive lens having a meniscus shape with a convex surface facing the object side, and a cemented lens consisting of a positive lens having a biconvex shape and a negative lens having a biconcave shape cemented to each other. With this configuration, the f-number light flux is efficiently converged, and an image pickup angle of view becomes more telephoto, with the result that spherical aberration and other various aberrations are satisfactorily corrected while the lens unit thickness of the first lens unit L1 is reduced.

The second lens unit L2 includes, in order from the object side to the image side, a positive lens having a meniscus shape with a convex surface facing the object side, a positive lens having a meniscus shape with a convex surface facing the object side, and a negative lens Ln having a meniscus shape with a convex surface facing the object side. The negative lens Ln has an aspherical lens surface on the object side. The second lens unit L2 further includes the aperture stop SP, a cemented lens consisting of a negative lens having a biconcave shape, an optical element Gp having a positive refractive power and a meniscus shape with a convex surface facing the object side, and a positive lens having a biconvex shape cemented to one another, and a cemented lens consisting of a negative lens having a biconcave shape and a positive lens having a biconvex shape cemented to each other.

With the lens arrangement that is a substantially symmetric system with respect to the aperture stop SP, various aberrations are satisfactorily corrected, and downsizing of the optical system and the high image quality are achieved. Moreover, with the arrangement of a plurality of positive lenses from the object side to the image side, the large aperture ratio is easily achieved.

The optical element Gp is formed by mixing particles of an inorganic oxide each having a particle size of from about 2 nm to about 50 nm into a resin or a solid material. Examples of the particles of the inorganic oxide include $TiO_2$ particles (vd=13.82 and θgF=0.873). It is known that, through dispersion of $TiO_2$ particles into a resin or a solid material at an appropriate volume ratio, the Abbe number, the partial dispersion ratio, and other various physical properties can be adjusted (Japanese Patent No. 5932444, for example).

The second lens unit L2 is configured to move from the image side to the object side during focusing from infinity to the closest distance. With this configuration, the high image quality is achieved, and fast focusing is facilitated.

The third lens unit L3 consists of, in order from the object side to the image side, a cemented lens consisting of a positive lens having a biconvex shape and a negative lens having a biconcave shape cemented to each other, a negative lens having a biconcave shape, and a positive lens having a biconvex shape. With this configuration, downsizing of the entire system is achieved while field curvature and other various aberrations are satisfactorily corrected.

Example 2

The image pickup optical system according to Example 2 has a focal length of 86.49 mm and an f-number of 1.24. The image pickup optical system L0 includes a first lens unit L1 having a positive refractive power, a second lens unit L2 having a positive refractive power, and a third lens unit L3 having a positive refractive power.

The first lens unit L1 consists of, in order from the object side to the image side, a cemented lens consisting of a positive lens having a biconvex shape and a negative lens having a biconcave shape cemented to each other. With this configuration, the f-number light flux is efficiently converged, and spherical aberration and other various aberrations are satisfactorily corrected while the lens unit thickness of the first lens unit L1 is reduced.

The second lens unit L2 includes, in order from the object side to the image side, a positive lens having a meniscus shape with a convex surface facing the object side, a positive lens having a meniscus shape with a convex surface facing the object side, and a negative lens Ln having a meniscus shape with a convex surface facing the object side. The negative lens Ln has an aspherical lens surface on the object side.

The second lens unit L2 further includes the aperture stop SP, a cemented lens consisting of a negative lens having a biconcave shape and a positive lens having a biconvex shape cemented to each other, and a cemented lens consisting of a negative lens having a biconcave shape, an optical element Gp having a positive refractive power and a meniscus shape with a convex surface facing the object side, and a positive lens having a biconvex shape cemented to one another. With the lens arrangement that is a substantially symmetric system with respect to the aperture stop SP, various aberrations are satisfactorily corrected, and downsizing of the optical system and the high image quality are achieved. Moreover, with the arrangement of a plurality of positive lenses from the object side to the image side, the large aperture ratio is easily achieved.

The second lens unit L2 is configured to move from the image side to the object side during focusing from infinity to the closest distance. With this configuration, the high image quality is achieved, and fast focusing is facilitated.

The third lens unit L3 consists of, in order from the object side to the image side, a cemented lens consisting of a positive lens having a biconvex shape and a negative lens having a biconcave shape cemented to each other, a negative lens having a biconcave shape, and a positive lens having a biconvex shape. With this configuration, downsizing of the entire system is achieved while field curvature and other various aberrations are satisfactorily corrected.

As compared to Example 1, this configuration has a main feature in that the number of positive lenses included in the first lens unit L1 is one.

Example 3

The image pickup optical system according to Example 3 has a focal length of 76.00 mm and an f-number of 1.30. The image pickup optical system L0 includes a first lens unit L1 having a positive refractive power, a second lens unit L2 having a positive refractive power, and a third lens unit L3 having a negative refractive power.

The first lens unit L1 consists of, in order from the object side to the image side, a cemented lens consisting of a positive lens having a biconvex shape and a negative lens having a biconcave shape cemented to each other. With this configuration, the f-number light flux is efficiently converged, and spherical aberration and other various aberrations are satisfactorily corrected while the lens unit thickness of the first lens unit L1 is reduced.

The second lens unit L2 includes, in order from the object side to the image side, a positive lens having a meniscus shape with a convex surface facing the object side, a positive lens having a meniscus shape with a convex surface facing the object side, and a negative lens Ln having a meniscus shape with a convex surface facing the object side. The negative lens Ln has an aspherical lens surface on the object side. The second lens unit L2 further includes the aperture stop SP, a cemented lens consisting of a negative lens having a biconcave shape and a positive lens having a biconvex shape cemented to each other, and a cemented lens consisting of a negative lens having a biconcave shape and an optical element Gp having a positive refractive power and a meniscus shape with a convex surface facing the object side, and a positive lens having a biconvex shape cemented to one another.

With the lens arrangement that is a substantially symmetric system with respect to the aperture stop SP, various aberrations are satisfactorily corrected, and downsizing of the optical system and the high image quality are achieved. Moreover, with the arrangement of a plurality of positive lenses from the object side to the image side, the large aperture ratio is achieved.

The second lens unit L2 is configured to move from the image side to the object side during focusing from infinity to the closest distance. With this configuration, the high image quality is achieved, and fast focusing is facilitated.

The third lens unit L3 consists of, in order from the object side to the image side, a cemented lens consisting of a positive lens having a biconvex shape and a negative lens having a biconcave shape cemented to each other, and a negative lens having a meniscus shape with a convex surface facing the image side. With this configuration, downsizing of the entire system is achieved while field curvature and other various aberrations are satisfactorily corrected.

As compared to Example 2, a main feature is that, with the third lens unit L3 having the negative refractive power, astigmatism is satisfactorily corrected even when the large angle of view is achieved.

Example 4

The image pickup optical system according to Example 4 has a focal length of 83.00 mm and an f-number of 1.24. The image pickup optical system L0 includes a first lens unit L1 having a positive refractive power, a second lens unit L2 having a positive refractive power, and a third lens unit L3 having a positive refractive power.

The first lens unit L1 consists of, in order from the object side to the image side, a positive lens having a meniscus shape with a convex surface facing the object side, and a cemented lens consisting of a positive lens having a biconvex shape and a negative lens a biconcave shape cemented to each other. With this configuration, the f-number light flux is efficiently converged, and spherical aberration and other various aberrations are satisfactorily corrected while the lens unit thickness of the first lens unit L1 is reduced.

The second lens unit L2 includes, in order from the object side to the image side, a positive lens having a meniscus shape with a convex surface facing the object side, a positive lens having a meniscus shape with a convex surface facing the object side, and a negative lens Ln having a meniscus shape with a convex surface facing the object side. The negative lens Ln has an aspherical lens surface on the object side. The second lens unit L2 further includes the aperture stop SP, a cemented lens consisting of a negative lens having a biconcave shape, an optical element Gp having a positive refractive power and a meniscus shape with a convex surface facing the object side, and a positive lens having a biconvex shape cemented to one another, and a cemented lens consisting of a negative lens having a biconcave shape and a positive lens having a biconvex shape cemented to each other.

With the lens arrangement that is a substantially symmetric system with respect to the aperture stop SP, various aberrations are satisfactorily corrected, and downsizing of the optical system and the high image quality are achieved. Moreover, with the arrangement of a plurality of positive lenses from the object side to the image side, the large aperture ratio is obtained.

The second lens unit L2 is configured to move from the image side to the object side during focusing from infinity to the closest distance. With this configuration, the high image quality is achieved, and fast focusing is facilitated.

The third lens unit L3 consists of, in order from the object side to the image side, a cemented lens consisting of a positive lens having a biconvex shape and a negative lens having a biconcave shape cemented to each other, a negative lens having a biconcave shape, and a positive lens having a biconvex shape. With this configuration, downsizing of the entire system is achieved while field curvature and other various aberrations are satisfactorily corrected.

As compared to Example 1, a main feature is that, with the positive lens arranged closest to the object side being formed of a lanthanum-based glass having a high refractive ratio, the lens unit thickness of the first lens unit L1 is reduced.

Example 5

The image pickup optical system according to Example 5 has a focal length of 93.00 mm and an f-number of 1.30. The image pickup optical system L0 includes a first lens unit L1 having a positive refractive power, a second lens unit L2 having a positive refractive power, and a third lens unit L3 having a positive refractive power.

The first lens unit L1 consists of, in order from the object side to the image side, a positive lens having a meniscus shape with a convex surface facing the object side, and a cemented lens consisting of a positive lens having a biconvex shape and a negative lens a biconcave shape cemented to each other. With this configuration, the f-number light flux is efficiently converged, and spherical aberration and other various aberrations are satisfactorily corrected while the lens unit thickness of the first lens unit L1 is reduced.

The second lens unit L2 includes, in order from the object side to the image side, a positive lens having a meniscus shape with a convex surface facing the object side, a positive lens having a meniscus shape with a convex surface facing the object side, and a negative lens Ln having a meniscus shape with a convex surface facing the object side. The negative lens Ln has an aspherical lens surface on the object side. The second lens unit L2 further includes the aperture stop SP, a cemented lens consisting of a negative lens having a biconcave shape, an optical element Gp having a positive refractive power and a meniscus shape with a convex surface facing the object side, and a positive lens having a biconvex shape cemented to one another, and a cemented lens consisting of a negative lens having a biconcave shape and a positive lens having a biconvex shape cemented to each other.

With the lens arrangement that is a substantially symmetric system with respect to the aperture stop SP, various aberrations are satisfactorily corrected, and downsizing of the optical system and the high image quality are achieved. Moreover, with the arrangement of a plurality of positive lenses from the object side to the image side, the large aperture ratio is obtained.

The second lens unit L2 is configured to move from the image side to the object side during focusing from infinity to the closest distance. With this configuration, the high image quality is achieved, and fast focusing is facilitated.

The third lens unit L3 consists of, in order from the object side to the image side, a cemented lens consisting of a positive lens having a biconvex shape and a negative lens having a biconcave shape cemented to each other, a negative lens having a meniscus shape with a convex surface facing the image side, and a positive lens having a biconvex shape. With this configuration, downsizing of the entire system is achieved while field curvature and other various aberrations are satisfactorily corrected.

As compared to Example 4, a main feature is that, although the focal length becomes more telephoto to be set for 93 mm, with an increase in anomalous dispersion characteristic θgF of the optical element Gp, axial chromatic aberration with respect to the g-line is reduced.

While the present invention has been described with reference to exemplary embodiments, the present invention is not limited to those exemplary embodiments, and can be modified and changed variously within the scope of the gist thereof.

Next, a digital still camera (image pickup apparatus) according to an embodiment of the present invention using the optical system according to each Example of the present invention as an image pickup optical system is described with reference to FIG. 11.

In FIG. 11, a camera main body 10 and an image pickup optical system 11 according to each Example of the present invention are illustrated. A CCD sensor, a CMOS sensor, or other image pickup element (photoelectric conversion element) 12 is included in the camera main body to receive light of an object image formed by the image pickup optical system 11.

Through thus applying the image pickup optical system according to each Example of the present invention to a digital still camera or other image pickup apparatus, the small size as the entire system and good optical performance are obtained.

Now, specific Numerical Data of Examples 1 to 5 is provided. In each set of Numerical Data, the order counted from the object side is represented by "i", a curvature radius of the i-th optical surface (i-th surface) is represented by "ri", and an interval on the axis between the i-th surface and the (i+1)-th surface is represented by "di". Moreover, a refractive index and an Abbe number of a material of an optical member between the i-th surface and the (i+1)-th surface with respect to the d-line are represented by "ndi" and "vdi", respectively.

When an X axis is defined in the optical axis direction, an H axis is defined in a direction perpendicular to the optical axis, a direction of travel of light is defined as positive, a paraxial curvature radius is represented by R, a conic constant is represented by K, and aspherical coefficients are represented by A4, A6, and A8, an aspherical shape is expressed by the following expression:

$$x=(h^2/R)/[1+\{1-(1+K)(h/R)^2\}^{1/2}]+A4 \cdot h^4+A6 \cdot h^6+A8 \cdot h^8.$$

The asterisk (*) means an aspherical surface. A paraxial curvature radius is represented by R, and "e-x" means $10^{-x}$.

The back focus BF is an air-equivalent distance from the last lens surface to the image plane. The total lens length is a value obtained by adding the back focus to a distance from the first lens surface to the last lens surface. Moreover, a relationship between the above-mentioned conditional expressions and Numerical Data is shown in Table 1. The partial dispersion characteristic ΔθgF and parameters regarding it of the material of the optical element Gp are shown in Table 2.

[Numerical Data 1]
Unit: mm

Surface data

| Surface number | r | d | nd | vd | Effective diameter |
|---|---|---|---|---|---|
| 1 | 98.275 | 4.07 | 1.80809 | 22.8 | 71.62 |
| 2 | 151.142 | 0.40 | | | 70.67 |
| 3 | 63.222 | 14.28 | 1.49700 | 81.5 | 66.38 |
| 4 | −341.659 | 2.80 | 1.65412 | 39.7 | 63.28 |
| 5 | 58.534 | (Variable) | | | 57.80 |
| 6 | 46.793 | 9.64 | 1.76385 | 48.5 | 57.22 |
| 7 | 185.232 | 0.40 | | | 55.93 |
| 8 | 45.601 | 7.74 | 1.59522 | 67.7 | 50.44 |
| 9 | 124.419 | 4.63 | | | 47.82 |
| 10* | 91.507 | 2.00 | 1.85478 | 24.8 | 40.79 |
| 11 | 29.710 | 10.32 | | | 35.34 |
| 12 (Stop) | ∞ | 5.90 | | | 32.91 |
| 13 | −55.801 | 1.49 | 1.66565 | 35.6 | 30.91 |
| 14 | 57.838 | 1.00 | 1.60401 | 29.8 | 30.51 |
| 15 | 83.214 | 9.22 | 1.88300 | 40.8 | 30.49 |
| 16 | −38.600 | 0.58 | | | 30.02 |
| 17 | −34.788 | 1.58 | 1.59551 | 39.2 | 29.64 |
| 18 | 53.255 | 5.82 | 1.90043 | 37.4 | 33.85 |
| 19 | −174.377 | (Variable) | | | 34.57 |
| 20 | 152.302 | 7.90 | 1.91082 | 35.3 | 36.12 |
| 21 | −45.905 | 1.67 | 1.69895 | 30.1 | 36.46 |
| 22 | 287.993 | 5.78 | | | 36.59 |
| 23 | −57.669 | 1.80 | 1.57501 | 41.5 | 36.87 |
| 24 | 746.660 | 1.03 | | | 38.50 |
| 25 | 157.660 | 3.17 | 1.91082 | 35.3 | 39.62 |
| 26 | −615.816 | 11.68 | | | 39.86 |
| 27 | ∞ | 2.30 | 1.51633 | 64.1 | 50.00 |
| 28 | ∞ | 1.00 | | | 50.00 |
| Image plane | ∞ | | | | |

Aspherical surface data

Tenth surface

K = 0.00000e+000    A4 = −1.77855e−006    A6 = 7.81665e−011
A8 = 3.38477e−013

Various data

| Focal length | 83.00 |
|---|---|
| F-number | 1.24 |
| Half angle of view (degrees) | 14.61 |
| Image height | 21.64 |
| Total lens length | 135.31 |
| BF | 14.19 |

[Numerical Data 1]
Unit: mm

| Object distance | Infinity | −0.85 m (Distance from image plane to object) |
|---|---|---|
| d5 | 16.39 | 1.50 |
| d19 | 1.50 | 16.39 |

| | |
|---|---|
| Entrance pupil position | 111.84 |
| Exit pupil position | −38.98 |
| Front principal point position | 65.29 |
| Rear principal point position | −68.81 |

Lens unit data

| Unit | First surface | Focal length | Lens unit structure length | Front principal point position | Rear principal point position |
|---|---|---|---|---|---|
| 1 | 1 | 1,525.46 | 21.55 | −230.20 | −212.01 |
| 2 | 6 | 88.31 | 60.33 | 14.57 | −46.40 |
| 3 | 20 | 201.91 | 21.35 | −2.44 | −17.19 |

Single lens data

| Lens | First surface | Focal length |
|---|---|---|
| 1 | 1 | 336.12 |
| 2 | 3 | 108.62 |
| 3 | 4 | −76.19 |
| 4 | 6 | 79.57 |
| 5 | 8 | 116.66 |
| 6 | 10 | −52.25 |
| 7 | 13 | −42.44 |
| 8 | 14 | 309.42 |
| 9 | 15 | 30.96 |
| 10 | 17 | −35.10 |
| 11 | 18 | 45.86 |
| 12 | 20 | 39.48 |
| 13 | 21 | −56.53 |
| 14 | 23 | −93.03 |
| 15 | 25 | 138.08 |

[Numerical Data 2]
Unit: mm

Surface data

| Surface number | r | d | nd | vd | Effective diameter |
|---|---|---|---|---|---|
| 1 | 71.115 | 15.69 | 1.61800 | 63.4 | 70.50 |
| 2 | −152.895 | 3.00 | 1.72047 | 34.7 | 68.73 |
| 3 | 113.337 | (Variable) | | | 64.54 |
| 4 | 65.863 | 5.62 | 1.92286 | 20.9 | 61.02 |
| 5 | 132.242 | 0.30 | | | 60.08 |
| 6 | 40.939 | 11.07 | 1.49700 | 81.5 | 54.90 |
| 7 | 212.154 | 6.75 | | | 52.70 |
| 8* | 77.288 | 2.50 | 1.85478 | 24.8 | 41.09 |
| 9 | 28.272 | 10.51 | | | 35.20 |
| 10 (Stop) | ∞ | 4.47 | | | 33.20 |
| 11 | −88.710 | 1.50 | 1.85478 | 24.8 | 31.80 |
| 12 | 35.954 | 8.92 | 1.88300 | 40.8 | 31.35 |
| 13 | −70.824 | 2.52 | | | 31.05 |
| 14 | −48.997 | 1.70 | 1.54072 | 47.2 | 29.92 |
| 15 | 57.367 | 1.00 | 1.60401 | 29.8 | 33.90 |
| 16 | 78.562 | 6.96 | 1.95375 | 32.3 | 34.08 |
| 17 | −75.388 | (Variable) | | | 35.27 |
| 18 | 205.477 | 7.00 | 1.95375 | 32.3 | 36.81 |
| 19 | −47.148 | 2.20 | 1.62004 | 36.3 | 36.98 |
| 20 | 100.153 | 5.30 | | | 36.30 |
| 21 | −52.471 | 1.65 | 1.68893 | 31.1 | 36.33 |
| 22 | 245.990 | 0.20 | | | 38.27 |
| 23 | 97.120 | 3.80 | 1.90043 | 37.4 | 39.35 |
| 24 | −730.839 | 12.23 | | | 39.58 |
| 25 | ∞ | 2.30 | 1.51633 | 64.1 | 50.00 |
| 26 | ∞ | 1.00 | | | 50.00 |
| Image plane | ∞ | | | | |

Aspherical surface data

Eighth surface

K = 0.00000e+000　　A4 = −2.32991e−006　　A6 = −2.41632e−010
A8 = 2.73963e−013

Various data

| | |
|---|---|
| Focal length | 86.49 |
| F-number | 1.24 |
| Half angle of view (degrees) | 14.04 |
| Image height | 21.64 |
| Total lens length | 134.72 |
| BF | 14.75 |

| Object distance | Infinity | −0.85 m (Distance from image plane to object) |
|---|---|---|
| d3 | 15.35 | 2.78 |
| d17 | 1.95 | 14.52 |

| | |
|---|---|
| Entrance pupil position | 114.65 |
| Exit pupil position | −36.99 |
| Front principal point position | 56.58 |
| Rear principal point position | −71.74 |

Lens unit data

| Unit | First surface | Focal length | Lens unit structure length | Front principal point position | Rear principal point position |
|---|---|---|---|---|---|
| 1 | 1 | 426.45 | 18.69 | −33.82 | −41.95 |
| 2 | 4 | 92.31 | 63.83 | 34.20 | −39.36 |
| 3 | 18 | 1,686.37 | 20.15 | −79.11 | −88.66 |

Single lens data

| Lens | First surface | Focal length |
|---|---|---|
| 1 | 1 | 80.70 |
| 2 | 2 | −89.92 |
| 3 | 4 | 136.63 |
| 4 | 6 | 99.92 |
| 5 | 8 | −53.41 |
| 6 | 11 | −29.77 |
| 7 | 12 | 28.11 |
| 8 | 14 | −48.60 |
| 9 | 15 | 345.89 |
| 10 | 16 | 41.25 |
| 11 | 18 | 40.76 |
| 12 | 19 | −51.41 |
| 13 | 21 | −62.63 |
| 14 | 23 | 95.42 |

[Numerical Data 3]
Unit: mm

Surface data

| Surface number | r | d | nd | vd | Effective diameter |
|---|---|---|---|---|---|
| 1 | 60.522 | 15.85 | 1.49700 | 81.5 | 68.89 |
| 2 | −211.610 | 2.80 | 1.65844 | 50.9 | 66.90 |
| 3 | 112.574 | (Variable) | | | 60.33 |

-continued

[Numerical Data 3]
Unit: mm

| | | | | | |
|---|---|---|---|---|---|
| 4 | 51.612 | 5.35 | 1.90366 | 31.3 | 49.78 |
| 5 | 98.396 | 0.40 | | | 48.60 |
| 6 | 35.386 | 8.91 | 1.49700 | 81.5 | 45.01 |
| 7 | 141.429 | 4.54 | | | 42.68 |
| 8* | 64.164 | 2.00 | 1.85478 | 24.8 | 35.67 |
| 9 | 25.870 | 9.23 | | | 31.20 |
| 10 (Stop) | ∞ | 3.95 | | | 29.49 |
| 11 | −111.538 | 1.49 | 1.69895 | 30.1 | 28.19 |
| 12 | 51.738 | 6.09 | 1.83481 | 42.7 | 27.59 |
| 13 | −111.907 | 1.71 | | | 27.02 |
| 14 | −53.172 | 1.58 | 1.64769 | 33.8 | 26.57 |
| 15 | 41.866 | 1.00 | 1.53876 | 44.7 | 30.94 |
| 16 | 54.882 | 7.41 | 1.95375 | 32.3 | 31.19 |
| 17 | −63.186 | (Variable) | | | 32.64 |
| 18 | 105.246 | 8.89 | 1.90043 | 37.4 | 34.84 |
| 19 | −37.150 | 1.67 | 1.68893 | 31.1 | 35.02 |
| 20 | 99.997 | 5.11 | | | 34.51 |
| 21 | −46.693 | 1.80 | 1.59522 | 67.7 | 34.55 |
| 22 | −194.997 | 11.50 | | | 36.13 |
| 23 | ∞ | 2.30 | 1.51633 | 64.1 | 50.00 |
| 24 | ∞ | 1.00 | | | 50.00 |
| Image plane | ∞ | | | | |

Aspherical surface data

Eighth surface

K = 0.00000e+000   A4 = −3.10311e−006   A6 = −6.79487e−010
A8 = 8.52139e−013

Various data

| | |
|---|---|
| Focal length | 76.00 |
| F-number | 1.30 |
| Half angle of view (degrees) | 15.89 |
| Image height | 21.64 |
| Total lens length | 127.52 |
| BF | 14.02 |

| Object distance | Infinity | −0.85 m (Distance from image plane to object) |
|---|---|---|
| d3 | 22.21 | 12.62 |
| d17 | 1.50 | 11.10 |

| | |
|---|---|
| Entrance pupil position | 107.06 |
| Exit pupil position | −27.65 |
| Front principal point position | 44.43 |
| Rear principal point position | −61.98 |

Lens unit data

| Unit | First surface | Focal length | Lens unit structure length | Front principal point position | Rear principal point position |
|---|---|---|---|---|---|
| 1 | 1 | 444.64 | 18.65 | −35.55 | −44.30 |
| 2 | 4 | 79.55 | 53.67 | 24.68 | −33.65 |
| 3 | 18 | −778.59 | 17.47 | 88.07 | 68.24 |

Single lens data

| Lens | First surface | Focal length |
|---|---|---|
| 1 | 1 | 96.56 |
| 2 | 2 | −111.22 |
| 3 | 4 | 113.94 |
| 4 | 6 | 92.38 |
| 5 | 8 | −51.96 |
| 6 | 11 | −50.38 |
| 7 | 12 | 43.11 |
| 8 | 14 | −35.93 |
| 9 | 15 | 319.09 |
| 10 | 16 | 31.77 |
| 11 | 18 | 31.42 |

-continued

[Numerical Data 3]
Unit: mm

| | | |
|---|---|---|
| 12 | 19 | −39.12 |
| 13 | 21 | −103.61 |

[Numerical Data 4]
Unit: mm

Surface data

| Surface number | r | d | nd | vd | Effective diameter |
|---|---|---|---|---|---|
| 1 | 85.893 | 5.13 | 1.90043 | 37.4 | 71.13 |
| 2 | 152.532 | 0.40 | | | 70.08 |
| 3 | 105.018 | 10.32 | 1.43875 | 94.7 | 68.23 |
| 4 | −436.487 | 2.80 | 1.65412 | 39.7 | 65.35 |
| 5 | 83.234 | (Variable) | | | 60.34 |
| 6 | 49.831 | 9.34 | 1.59522 | 67.7 | 58.53 |
| 7 | 192.004 | 0.40 | | | 57.40 |
| 8 | 42.117 | 9.43 | 1.59522 | 67.7 | 52.05 |
| 9 | 136.933 | 5.71 | | | 49.32 |
| 10* | 81.733 | 2.00 | 1.72047 | 34.7 | 40.61 |
| 11 | 26.954 | 10.32 | | | 34.68 |
| 12 (Stop) | ∞ | 5.33 | | | 32.54 |
| 13 | −53.697 | 1.49 | 1.67270 | 32.1 | 30.90 |
| 14 | 69.268 | 1.00 | 1.53876 | 44.7 | 30.60 |
| 15 | 116.260 | 7.44 | 1.88300 | 40.8 | 30.59 |
| 16 | −42.531 | 1.50 | | | 30.35 |
| 17 | −39.099 | 1.58 | 1.61293 | 37.0 | 28.85 |
| 18 | 50.782 | 7.03 | 1.91082 | 35.3 | 33.14 |
| 19 | −116.755 | (Variable) | | | 34.25 |
| 20 | 156.232 | 8.34 | 1.88300 | 40.8 | 35.93 |
| 21 | −45.295 | 1.67 | 1.64769 | 33.8 | 36.34 |
| 22 | 132.087 | 4.93 | | | 36.42 |
| 23 | −57.767 | 1.80 | 1.59551 | 39.2 | 36.56 |
| 24 | 412.298 | 0.50 | | | 38.50 |
| 25 | 102.816 | 3.82 | 1.90043 | 37.4 | 39.85 |
| 26 | −748.949 | 11.73 | | | 40.08 |
| 27 | ∞ | 2.30 | 1.51633 | 64.1 | 50.00 |
| 28 | ∞ | 1.00 | | | 50.00 |
| Image plane | ∞ | | | | |

Aspherical surface data

Tenth surface

K = 0.00000e+000   A4 = −2.21529e−006   A6 = −6.51574e−011
A8 = 1.97966e−013

Various data

| | |
|---|---|
| Focal length | 83.00 |
| F-number | 1.24 |
| Half angle of view (degrees) | 14.61 |
| Image height | 21.64 |
| Total lens length | 133.19 |
| BF | 14.25 |

| Object distance | Infinity | −0.85 m (Distance from image plane to object) |
|---|---|---|
| d5 | 15.17 | 1.50 |
| d19 | 1.50 | 15.17 |

| | |
|---|---|
| Entrance pupil position | 110.99 |
| Exit pupil position | −38.72 |
| Front principal point position | 63.94 |
| Rear principal point position | −68.75 |

-continued

[Numerical Data 4]
Unit: mm

Lens unit data

| Unit | First surface | Focal length | Lens unit structure length | Front principal point position | Rear principal point position |
|---|---|---|---|---|---|
| 1 | 1 | 747.96 | 18.65 | −76.59 | −80.36 |
| 2 | 6 | 92.29 | 62.57 | 19.12 | −46.35 |
| 3 | 20 | 229.07 | 21.06 | −0.78 | −14.96 |

Single lens data

| Lens | First surface | Focal length |
|---|---|---|
| 1 | 1 | 210.66 |
| 2 | 3 | 194.06 |
| 3 | 4 | −106.64 |
| 4 | 6 | 110.36 |
| 5 | 8 | 98.53 |
| 6 | 10 | −56.69 |
| 7 | 13 | −44.75 |
| 8 | 14 | 315.73 |
| 9 | 15 | 36.06 |
| 10 | 17 | −35.80 |
| 11 | 18 | 39.65 |
| 12 | 20 | 40.55 |
| 13 | 21 | −51.88 |
| 14 | 23 | −84.96 |
| 15 | 25 | 100.62 |

[Numerical Data 5]
Unit: mm

Surface data

| Surface number | r | d | nd | vd | Effective diameter |
|---|---|---|---|---|---|
| 1 | 106.769 | 5.74 | 1.90043 | 37.4 | 74.14 |
| 2 | 280.000 | 0.40 | | | 73.25 |
| 3 | 129.732 | 10.61 | 1.43875 | 94.7 | 70.58 |
| 4 | −251.899 | 2.80 | 1.65412 | 39.7 | 68.18 |
| 5 | 97.964 | (Variable) | | | 64.49 |
| 6 | 55.085 | 8.25 | 1.59522 | 67.7 | 61.29 |
| 7 | 149.675 | 0.40 | | | 60.18 |
| 8 | 46.556 | 10.36 | 1.59522 | 67.7 | 55.91 |
| 9 | 253.783 | 7.20 | | | 53.62 |
| 10* | 163.651 | 2.00 | 1.72047 | 34.7 | 43.05 |
| 11 | 30.087 | 11.02 | | | 36.94 |
| 12 (Stop) | ∞ | 4.18 | | | 35.00 |
| 13 | −127.698 | 1.49 | 1.67270 | 32.1 | 33.72 |
| 14 | 48.792 | 1.00 | 1.60401 | 29.8 | 32.99 |
| 15 | 63.573 | 7.43 | 1.88300 | 40.8 | 32.96 |
| 16 | −509.809 | 1.89 | | | 32.10 |
| 17 | −235.047 | 1.58 | 1.61293 | 37.0 | 31.48 |
| 18 | 59.972 | 8.50 | 1.91082 | 35.3 | 31.86 |
| 19 | −149.349 | (Variable) | | | 33.67 |
| 20 | 86.166 | 8.50 | 1.88300 | 40.8 | 36.73 |
| 21 | −44.007 | 1.67 | 1.64769 | 33.8 | 36.77 |
| 22 | 70.813 | 6.76 | | | 35.86 |
| 23 | −44.658 | 1.80 | 1.59551 | 39.2 | 35.96 |
| 24 | −1,491.939 | 0.50 | | | 38.23 |
| 25 | 142.767 | 3.80 | 1.90043 | 37.4 | 39.57 |
| 26 | −241.815 | 11.94 | | | 39.88 |
| 27 | ∞ | 2.30 | 1.51633 | 64.1 | 50.00 |
| 28 | ∞ | 1.00 | | | 50.00 |
| Image plane | ∞ | | | | |

[Numerical Data 5]
Unit: mm

Aspherical surface data

Tenth surface

K = 0.00000e+000  A4 = −1.42661e−006  A6 = 3.60279e−010
A8 = −3.34599e−014

Various data

| Focal length | 93.00 |
|---|---|
| F-number | 1.30 |
| Half angle of view (degrees) | 13.10 |
| Image height | 21.64 |
| Total lens length | 147.52 |
| BF | 14.45 |

| Object distance | Infinity | −0.85 m (Distance from image plane to object) |
|---|---|---|
| d5 | 21.14 | 1.5 |
| d19 | 4.06 | 23.7 |

| Entrance pupil position | 127.83 |
|---|---|
| Exit pupil position | −54.09 |
| Front principal point position | 63.84 |
| Rear principal point position | −92.00 |

Lens unit data

| Unit | First surface | Focal length | Lens unit structure length | Front principal point position | Rear principal point position |
|---|---|---|---|---|---|
| 1 | 1 | 546.72 | 19.55 | −49.61 | −56.93 |
| 2 | 6 | 116.04 | 65.28 | 13.45 | −50.77 |
| 3 | 20 | 235.22 | 23.03 | −8.04 | −23.80 |

Single lens data

| Lens | First surface | Focal length |
|---|---|---|
| 1 | 1 | 188.70 |
| 2 | 3 | 196.84 |
| 3 | 4 | −107.49 |
| 4 | 6 | 141.82 |
| 5 | 8 | 94.04 |
| 6 | 10 | −51.49 |
| 7 | 13 | −52.30 |
| 8 | 14 | 338.80 |
| 9 | 15 | 64.41 |
| 10 | 17 | −77.80 |
| 11 | 18 | 47.91 |
| 12 | 20 | 34.03 |
| 13 | 21 | −41.67 |
| 14 | 23 | −77.34 |
| 15 | 25 | 100.16 |

TABLE 1

|  | Conditional Expression (1) | Conditional Expression (2) | Conditional Expression (3) | Conditional Expression (4) | Conditional Expression (5) | Conditional Expression (6) | Conditional Expression (7) | Conditional Expression (8) | Conditional Expression (9) | Conditional Expression (10) |
|---|---|---|---|---|---|---|---|---|---|---|
| Example 1 | 1.85478 | 0.148 | 3.73 | 0.48 | 1.9108 | 0.59 | 1.06 | 0.084 | 0.105 | 1.24 |
| Example 2 | 1.85478 | 0.148 | 4.00 | 0.47 | 1.9538 | 0.58 | 1.07 | 0.115 | 0.109 | 1.24 |
| Example 3 | 1.85478 | 0.058 | 4.20 | 0.41 | 1.9004 | 0.65 | 1.05 | 0.085 | 0.110 | 1.30 |
| Example 4 | 1.72047 | 0.058 | 3.80 | 0.49 | 1.8830 | 0.61 | 1.11 | 0.101 | 0.107 | 1.24 |
| Example 5 | 1.72047 | 0.148 | 3.64 | 0.37 | 1.8830 | 0.44 | 1.25 | 0.119 | 0.098 | 1.30 |

TABLE 2

(Optical Element Gp)

|  | ΔθgF | vd | Nd | Ng | NC | NF |
|---|---|---|---|---|---|---|
| Example 1 | 0.148 | 29.83 | 1.60401 | 1.63402 | 1.59860 | 1.61885 |
| Example 2 | 0.148 | 29.83 | 1.60401 | 1.63402 | 1.59860 | 1.61885 |
| Example 3 | 0.058 | 44.71 | 1.53876 | 1.55488 | 1.53533 | 1.54738 |
| Example 4 | 0.058 | 44.71 | 1.53876 | 1.55488 | 1.53533 | 1.54738 |
| Example 5 | 0.148 | 29.83 | 1.60401 | 1.63402 | 1.59860 | 1.61885 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-038382, filed Mar. 5, 2018, which is hereby incorporated by reference herein in its entirety.

What is claimed is:

1. An optical system comprising, in order from an object side to an image side:
a first lens unit having a positive refractive power;
a second lens unit having a positive refractive power; and
a third lens unit,
wherein an interval between each pair of adjacent lens units is changed during focusing,
wherein the second lens unit is configured to move toward the object side during focusing from infinity to a closest distance,
wherein the second lens unit includes, in order from the object side to the image side, at least one positive lens, a negative lens Ln having a meniscus shape that is concave toward the image side, an aperture stop, and a cemented lens consisting of a plurality of lenses and an optical element Gp cemented to one another and having a concave lens surface on the object side,
wherein the third lens unit includes a positive lens LP1 and a negative lens disposed on the image side of the positive lens LP1, and
wherein the following conditional expressions are satisfied:

$1.70 < Nn$; and $0.0272 < \theta gF + 1.665 \times 10^{-7} \times vd^3 + 5.213 \times 10^{-5} \times vd^2 - 5.656 \times 10^{-3} \times vd + 7.278 \times 10^{-1})$ where Nn is a refractive index with respect to a d-line of a material of the negative lens Ln included in the second lens unit, vd is an Abbe number of a material of the optical element Gp included in the cemented lens disposed on the image side of the aperture stop, and θgF is a partial dispersion ratio of the material of the optical element Gp included in the cemented lens disposed on the image side of the aperture stop.

2. The optical system according to claim 1, wherein the following conditional expression is satisfied:

$3.40 < FGp/F < 4.45$ where FGp is a focal length of the optical element Gp, and F is a focal length of the optical system.

3. The optical system according to claim 1, wherein the following conditional expression is satisfied:

$0.12 < F3p/F < 0.74$ where F3p is a focal length of a positive lens closest to the object side in the third lens unit, and F is a focal length of the optical system.

4. The optical system according to claim 1, wherein the following conditional expression is satisfied:

$1.80 < N3p$ where N3p is a refractive index with respect to the d-line of a material of a positive lens closest to the object side in the third lens unit.

5. The optical system according to claim 1, wherein the following conditional expression is satisfied:

$0.22 |LnF|/F2 < 0.87$ where LnF is a focal length of the negative lens Ln, and F2 is a focal length of the second lens unit.

6. The optical system according to claim 1, wherein the following conditional expression is satisfied:

$0.8 < F2/F < 1.5$ where F2 is a focal length of the second lens unit, and F is a focal length of the optical system.

7. The optical system according to claim 1, wherein the following conditional expression is satisfied:

$0.070 < LnD/FF < 0.142$ where LnD is an interval between the negative lens Ln and a lens arranged adjacent to and on the object side of the negative lens Ln, and FF is a focal length of a lens system consisting of lenses arranged on the object side of the negative lens Ln when the optical system is focused at infinity.

8. The optical system according to claim 1, wherein the first lens unit consists of, in order from the object side to the image side, at least one positive lens and one negative lens.

9. The optical system according to claim 1, wherein the negative lens Ln has an aspherical lens surface on the object side.

10. The optical system according to claim 1, wherein two cemented lenses each consisting of a plurality of lenses cemented to one another and having a meniscus shape with a concave surface facing the object side are provided on the image side of the aperture stop.

11. The optical system according to claim 1, wherein the following conditional expression is satisfied:

$$0.085 < BF/TD < 0.150$$

where BF is a back focus of the optical system, and TD is a total lens length of the optical system.

12. The optical system according to claim 1, wherein the following conditional expression is satisfied:

$$Fno < 1.45$$

where Fno is an open f-number of the optical system.

13. An image pickup apparatus comprising:
an optical system; and
a photoelectric conversion element configured to receive light of an image formed by the optical system,
wherein the optical system includes, in order from an object side to an image side:
   a first lens unit having a positive refractive power;
   a second lens unit having a positive refractive power; and
   a third lens unit,
wherein an interval between each pair of adjacent lens units being changed during focusing,
wherein the second lens unit being configured to move toward the object side during focusing from infinity to a closest distance,
wherein the second lens unit including, in order from the object side to the image side, at least one positive lens, a negative lens Ln having a meniscus shape that is concave toward the image side, an aperture stop, and a cemented lens consisting of a plurality of lenses and an optical element Gp cemented to one another and having a concave lens surface on the object side,
wherein the third lens unit including a positive lens LP1 and a negative lens disposed on the image side of the positive lens LP1, and
wherein the following conditional expressions are satisfied:

$$1.70 < Nn;\ \text{and}$$

$$0.0272 < \theta gF + 1.665 \times 10^{-7} \times vd^3 + 5.213 \times 10^{-5} \times vd^2 - 5.656 \times 10^{-3} \times vd + 7.278 \times 10^{-1})$$

where Nn is a refractive index with respect to a d-line of a material of the negative lens Ln included in the second lens unit, vd is an Abbe number of a material of the optical element Gp included in the cemented lens disposed on the image side of the aperture stop, and θgF is a partial dispersion ratio of the material of the optical element Gp included in the cemented lens disposed on the image side of the aperture stop.

* * * * *